Nov. 11, 1969      W. A. RAY      3,477,462
HIGH CAPACITY PRESSURE REGULATED GAS DIAPHRAGM VALVE
Filed June 30, 1966

INVENTOR.
WILLIAM A. RAY
By Gordon H. Olson
ATTORNEY.

United States Patent Office

3,477,462
Patented Nov. 11, 1969

3,477,462
HIGH CAPACITY PRESSURE REGULATED GAS DIAPHRAGM VALVE
William A. Ray, North Hollywood, Calif., assignor to International Telephone and Telegraph Corporation, New York, N.Y., a corporation of Maryland
Filed June 30, 1966, Ser. No. 562,160
Int. Cl. F23n 1/00
U.S. Cl. 137—489                                                    1 Claim

ABSTRACT OF THE DISCLOSURE

The invention includes a main diaphragm valve which has a pressure-regulated output through the control of pilot pressure regulator.

---

Figure 1:
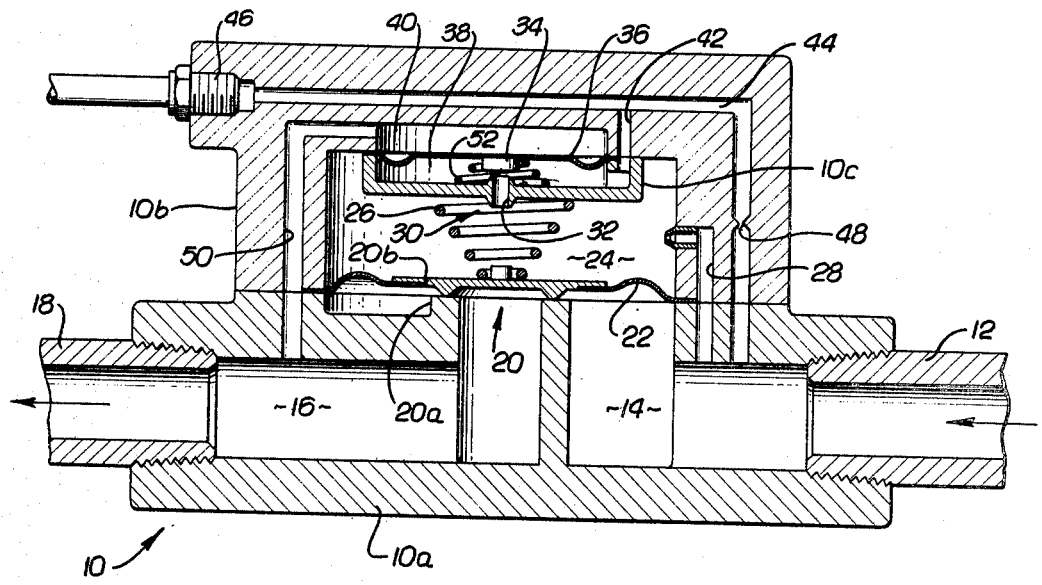

This invention relates to gas burner systems and more particularly to an improved pressure regulated main valve for controlling the flow of fuel to a burner. The improved valve is especially useful in connection with a burner system employing a pilot burner which requires a constant flow of fuel.

A common type valve employed to control the flow of fuel to a burner is that having a diaphragm construction wherein one side of the diaphragm is exposed to full fuel inlet pressure while the other side of the diaphragm is exposed to inlet pressure through a restricted passage. The fuel flowing through the restricted passage is subsequently bled from the chamber formed on that side of the diaphragm to obtain the necessary control over the fuel flow. In this way, the inlet gas pressure is employed to open the main valve. It is also desirable that the fuel pressure to the burner be regulated to maintain a desired pressure drop independent of line pressure variations. As one approach, a separate pressure regulator valve may be placed in series with the main valve. However, to minimize costs and to provide a more compact unit, it has been suggested that an additional diaphragm serving as a regulator valve be combined with the bleed means for the diaphragm chamber of the main valve.

In one such arrangement, the fuel pressure regulator is subjected to the pressure differential between atmospheric pressure and that of the fuel line downstream from the main valve. While this is quite satisfactory for pressure regulation, the known prior art arrangements have not had a pressure differential across the main valve diaphragm sufficiently great to provide a high capacity rapidly responsive valve.

Hence, it is a primary object of this invention to provide an improved high capacity combined pressure regulated gas diaphragm valve.

It is another object of the invention to provide such a diaphragm valve in which the fuel bled from a control diaphragm chamber is conducted to a pilot burner fuel line of the type which operates at substantially atmospheric pressure.

In accordance with the invention, there is provided a fuel valve construction including a valve body, a fuel inlet connection, an outlet connection leading to a fuel burner and a main valve positioned between the connections. A pressure inlet chamber is formed in the valve body with a movable pressure responsive element such as a flexible diaphragm forming a wall of the chamber. The position of this diaphragm controls the position of the fuel valve. The opposite side of the diaphragm forms a wall of a second pressure chamber which is connected through a restricted passage to the inlet chamber. To permit the main valve to open, pressure in the second chamber is bled to a third chamber which is in communication with atmospheric pressure. In the preferred form of the invention, this atmospheric pressure connection is to a fuel line leading from the inlet pressure chamber to an atmospheric pressure pilot burner orifice, with a restriction being formed in the line to permit atmospheric pressure to exist downstream from the restriction. A second diaphragm forms a wall of the third pressure chamber and the position of this diaphragm controls the fuel bled from the second pressure chamber. To obtain the desired pressure regulation, the opposite side of the second diaphragm is in communication with main line fuel pressure downstream from the valve. Thus, in effect, the bleed valve function and the pressure regulating function are uniquely combined in a single integral construction.

Figure 2:
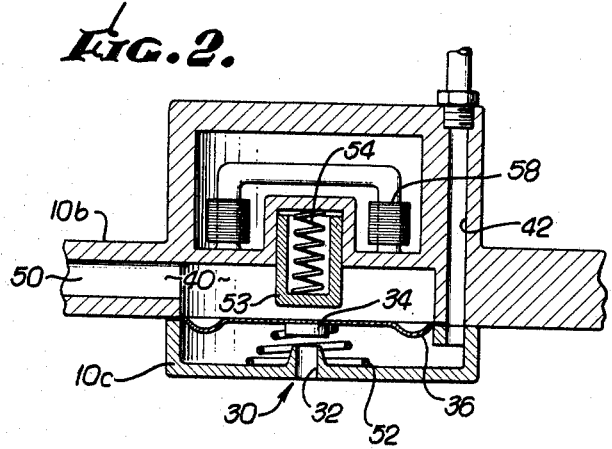

Further features and attendant advantages will become apparent with reference to the following description and drawings in which:

FIG. 1 is a cross-sectional schematic view of the improved valve construction of the invention; and FIG. 2 is a cross-sectional schematic view of an electromagnetic means for overpowering operation of the pressure regulator valve.

Referring now to FIG. 1 for a more detailed description of the invention, there is shown a valve body 10 conveniently formed of three separate structural sections 10a, 10b and 10c. In valve body section 10a, there is formed a fuel inlet connection 12 leading to inlet pressure chamber 14 formed therein and an outlet chamber 16 leading to a fuel outlet connection 18. A main valve 20 consisting of a valve seat 20a formed integral with the valve body section 10a and a movable valve member 20b which is mounted on a flexible pressure responsive diaphragm 22 clamped between body sections 10a and 10b. Since diaphragm 22 forms a wall of inlet pressure chamber 14, the inlet pressure tends to force the main valve 20 open.

The opposite or top side of the diaphragm 22 forms a wall of a second pressure chamber 24 formed in the valve body section 10b with section 10c forming a portion of the upper wall of chamber 24. To counteract the fuel inlet pressure exerted on the lower side of diaphragm 22, there is provided a coil spring 26 engaging the upper surface of diaphragm above valve member 20b and the lower surface of body section 10c. The spring pressure is normally less than the inlet pressure existing in the chamber 14. Hence, to provide further control of the valve 20, there is provided a restricted passage 28 extending between the inlet chamber 14 and the control pressure chamber 24. Unless fuel is bled from chamber 24, pressure supplied through restricted passage 28 naturally tends to close to the main valve 20, with the assistance of spring 26.

To control the operation of main valve 20, there is provided a bleed valve 30 including a bleed orifice 32 formed in body member 10c and controlled by movable valve member 34 mounted on a diaphragm 36 which is clamped between body sections 10b and 10c. In accordance with the invention, the bleed valve 30 has been uniquely combined with a pressure regulating function. As can be seen, the diaphragm 36 forms a common wall for chambers 38 and 40.

Chamber 38 is connected by passage 42 to a fuel line or conduit 44 adapted to be connected at its outlet 46 to a pilot burner. The pilot fuel line is connected to the inlet pressure chamber 14, and restriction 48 formed in pilot fuel line 44 produces a sharp pressure drop. By employing a pilot burner connected to outlet 46 which utilizes atmospheric fuel pressure, chamber 38 can be maintained at essentially such pressure.

The opposite side of diaphragm 36 through chamber 40 is connected by passage 50 with chamber 16 downstream of the main fuel valve 20. To permit the pressure of chamber 40 to be applied on diaphragm 36, there is employed a spring member 52 having one end engaging body section 10c around orifice 32 and the other end engaging diaphragm 36 surrounding valve member 34.

There are several significant advantages of the above described valve consrtuction. By having the pressure chamber 38 exposed to atmospheric pressure, main valve 20 can have a relatively high capacity for a given diaphragm and it is comparatively fast acting in view of the relatively large pressure differential between inlet chamber 14 and atmospheric pressure. At the same time, the fuel bled from chamber 24 is ducted to the pilot burner rather than outside as in many prior art arrangements. Such procedure is essentially wasteful of fuel and presents a potentially hazardous situation as well as undesirable odors which are readily detected.

The other major function performed by the unique valve structiure of the invention is that of pressure regulation. Since line pressure to the fuel valve typically fluctuates, it is desirable to include a pressure regulator which insures the proper pressure of the fuel being conducted to the main burner. In the arrangement shown, this is accomplished by having one side of the diaphragm 36 exposed to downstream pressure while the other side is essentially exposed to atmospheric pressure. When the downstream line pressure becomes too high, diaphragm 36 is moved downwardly so that valve member 34 throttles the flow of fuel bled from chamber 24. This in turn causes a pressure buildup in chamber 24 by virtue of its connection with pressure chamber 14, with the result that diaphragm 22 and valve member 20b move toward the valve seat 20a causing a reduction of fuel flow through the valve. It can be seen that the single uniquely combined valve structure of the invention provides both pressure regulation and fuel metering for the burner.

In accordance with another aspect of this invention, the fuel metering function of the valve structure may be further enhanced by employing means for overpowering diaphragm 36 so that valve orifice 32 of valve 30 may be closed by valve member 34 which in turn causes main valve 20 to close. Accordingly, and as shown in FIG. 2, an electromagnetic valve closing structure is illustrated including a plunger 53 normally urged downwardly by coil spring 54 shown held in a retracted position by plunger coil structure 58. When the coil is deenergized, spring 56 urges plunger 53 downwardly to engage the upper surface of diaphragm 36 causing valve 34 to be forced downwardly to close bleed valve 30. Thus, deenergization of the coil overrides the pressure regulating function of the assembly in the closing direction of the main valve 20.

What is claimed is:
1. A valve construction comprising:
   a valve body having a fuel inlet connection, an outlet connection to be connected to a fuel burner, and main valve means between said connections;
   means defining a pressure inlet chamber in said body;
   a first movable pressure responsive element forming a wall of said inlet chamber connected to control said main valve means and hence fuel flow to said outlet connection;
   means forming a second pressure chamber in said body defined in part by said pressure responsive element, said second chamber being on the opposite side of the element from said inlet chamber;
   a restricted fluid passage connecting said chambers;
   means defining third and fourth pressure chambers including a second pressure responsive element forming a common wall of said third and fourth chambers;
   a bleed orifice connecting said second and third chambers and a bleed valve member for controlling flow therethrough, said bleed valve member being connected to said second pressure responsive element to be controlled thereby;
   a passage connecting said third chamber to atmospheric pressure;
   means connecting said fourth chamber to said outlet connection downstream of said main valve;
   and a pilot fuel line leading from said inlet chamber to a pilot burner connection substantially at atmospheric pressure and including a restriction in said line so that the pressure downstream of the restriction is close to atmospheric pressure;
   said passage leading from said third member being connected to said fuel line downstream of the fuel line restriction.

References Cited

UNITED STATES PATENTS

| 2,951,499 | 9/1960 | Singer | 137—489 |
| 2,977,966 | 4/1961 | Matthews | 137—489 XR |
| 3,304,002 | 2/1967 | Grayson | 137—498 XR |

M. CARY NELSON, Primary Examiner

R. J. MILLER, Assistant Examiner

U.S. Cl. X.R.

137—495